United States Patent [19]

Mason et al.

[11] Patent Number: 5,780,146
[45] Date of Patent: Jul. 14, 1998

[54] ABRADABLE COMPOSITION, A METHOD OF MANUFACTURING AN ABRADABLE COMPOSITION AND A GAS TURBINE ENGINE HAVING AN ABRADABLE SEAL

[75] Inventors: Stephen Mason, Warwickshire; Michael J. L. Percival, Derbyshire; Gary B. Merrill; Paul A. Doleman, both of Derby, all of England

[73] Assignee: Rolls-Royce plc, London, England

[21] Appl. No.: 651,486

[22] Filed: May 22, 1996

[30] Foreign Application Priority Data

Jun. 29, 1995 [GB] United Kingdom ............... 9513252

[51] Int. Cl.$^6$ ............... C04B 35/447; C04B 35/78; F01D 11/00; B32B 5/16
[52] U.S. Cl. ............... 428/328; 428/402; 428/325; 428/331
[58] Field of Search ............... 428/402, 446, 428/323, 325, 328, 331

[56] References Cited

U.S. PATENT DOCUMENTS

| 4,177,308 | 12/1979 | Beeler . | |
|---|---|---|---|
| 4,423,097 | 12/1983 | Mons et al. . | |
| 4,440,865 | 4/1984 | Salazar | 501/95 |
| 4,639,388 | 1/1987 | Ainsworth et al. . | |
| 5,204,289 | 4/1993 | Moh | 501/5 |

FOREIGN PATENT DOCUMENTS

| 2264789 | 10/1975 | France . |
|---|---|---|
| 2053765 | 5/1971 | Germany . |
| 1448320 | 9/1976 | United Kingdom . |
| 2056502 | 3/1981 | United Kingdom . |
| 2072222 | 6/1981 | United Kingdom . |
| 2081246 | 2/1982 | United Kingdom . |

*Primary Examiner*—Daniel Zirker
*Attorney, Agent, or Firm*—W. Warren Taltavull

[57] ABSTRACT

An abradable seal comprises a plurality of hollow aluminosilicate spheres in a matrix of aluminium phosphate. The matrix of aluminium phosphate also has an aluminosilicate filler. The hollow aluminosilicate spheres have a diameter in the range of 400 to 1800 microns, preferably a diameter in the range of 800 to 1400 microns. The weight proportion of hollow aluminosilicate spheres in the abradable seal is 30% to 50%. The density of the abradable seal is 1.5 grammes per cubic centimetre. The hollow aluminosilicate spheres in the aluminium phosphate matrix have a relatively high temperature capability of approximately 1300° C. maximum. This makes the abradable seal better able to withstand the environment in the turbine of a turbofan gas turbine engine.

11 Claims, 1 Drawing Sheet

ABRADABLE COMPOSITION, A METHOD OF MANUFACTURING AN ABRADABLE COMPOSITION AND A GAS TURBINE ENGINE HAVING AN ABRADABLE SEAL

FIELD OF THE INVENTION

The present invention relates to abradable seals, and is particularly concerned with abradable seals between rotating and static components in gas turbine engines. In particular the abradable seals are applied to the static shroud segments spaced radially from rotor blades, for example turbine blades.

BACKGROUND OF THE INVENTION

In order to improve the performance and efficiency of a gas turbine engine it has been necessary to reduce the amount of air used for cooling the turbine components. This has lead to the replacement of air cooled metallic shroud segments with uncooled ceramic matrix composite shroud segments, for example silicon carbide fibres in an alumina matrix.

Conventional abradable seals on cooled metallic shrouds comprise metallic honeycombs. These are not suitable for use on ceramic matrix composite shroud segments. Ceramic honeycombs have been applied to ceramic matrix shroud segments to form abradable seals, but these were found to cause unacceptable wear of the nickel base turbine blades. Ceramic foams have been applied to ceramic matrix shroud segments to form abradable seals, and these did not produce significant wear on the nickel base turbine blades, however these did not provide a satisfactory seal and they suffer from erosion.

SUMMARY OF THE INVENTION

The present invention seeks to provide an abradable seal suitable for a ceramic matrix composite shroud segment which overcomes the above mentioned problems.

Accordingly the present invention provides an abradable composition comprising hollow aluminosilicate spheres, or hollow alumina spheres, in an aluminium phosphate matrix.

Preferably the hollow spheres have a diameter in the range 400 to 1800 microns. More preferably the hollow spheres have a diameter in the range 800 to 1400 microns.

Preferably the abradable seal includes an aluminosilicate filler.

Preferably the weight proportion of hollow spheres is 30% to 50%.

Preferably the abradable seal has a density of approximately 1.5 grammes per cubic centimetre.

The present invention also provides a method of manufacturing an abradable composition comprising the steps of:
(a) forming a paste of aluminium phosphate,
(b) adding hollow aluminosilicate spheres, or hollow alumina spheres, to the paste,
(c) mixing the paste and hollow aluminosilicate spheres or hollow alumina spheres to form a ceramic slurry,
(d) moulding the ceramic slurry of hollow aluminosilicate spheres, or hollow alumina spheres, and paste to a required shape,
(e) heat treating the moulded ceramic slurry of hollow aluminosilicate spheres, or hollow alumina spheres, and paste to form an aluminium phosphate matrix containing hollow aluminosilicate spheres, or hollow alumina spheres.

Step (a) may include mixing aluminosilicate powder and water with alumina powder and phosphoric acid to form the paste. Step (a) comprises mixing 54.3 wt. % aluminosilicate powder, 23.3 wt. % alumina powder and 22.4 wt. % of 96% phosphoric acid and water.

Preferably step (a) includes mixing aluminosilicate powder with mono aluminium phosphate solution. Step (a) comprises mixing 46.2 wt. % mono aluminium phosphate solution and 53.8 wt. % aluminosilicate powder.

Preferably in step (b) 70 wt. % of the paste is mixed with 30 wt. % of the hollow aluminosilicate spheres.

Preferably step (e) includes heating treating the moulded mixture sequentially for 10 hours at 60° C., for 1 hour at 120° C., for 1.5 hours at 350° C., for 2 hours at 800° C., for 2 hours at 1100° C. and for 1 hour at 1200° C.

Preferably step (d) includes moulding the mixture of hollow aluminosilicate spheres, or hollow alumina spheres, and paste on a ceramic matrix composite material.

Preferably the ceramic matrix composite material comprises silicon carbide fibres in an alumina matrix, step (e) comprises heat treating the moulded mixture of hollow aluminosilicate spheres, or hollow alumina spheres, and paste within the mould to bond the alumina matrix of the ceramic matrix composite material to the aluminium phosphate matrix containing the aluminosilicate filler and the hollow aluminosilicate spheres, or hollow alumina spheres.

The present invention also provides a gas turbine engine having an abradable seal comprising hollow aluminosilicate spheres, or hollow alumina spheres, in an aluminium phosphate matrix.

Preferably the hollow spheres have a diameter in the range 400 to 1800 microns. More preferably the hollow spheres have a diameter In the range 800 to 1400 microns.

Preferably the abradable seal includes an aluminosilicate filler.

Preferably the weight proportion of hollow spheres is 30% to 50%.

Preferably the abradable seal has a density of approximately 1.5 grams per cubic centimetre.

Preferably the abradable seal is bonded to a turbine shroud.

Preferably the turbine shroud comprises a ceramic matrix composite material.

Preferably the ceramic matrix composite material comprises silicon carbide fibres in an alumina matrix.

Preferably the abradable seal is bonded to the ceramic matrix composite material by an adhesive containing mono aluminium phosphate.

BRIEF DESCRIPTION OF THE DRAWINGS

The present invention will be more fully described by way of example with reference to the accompanying drawings, in which.

DETAILED DESCRIPTION OF THE INVENTION

Figure 1:
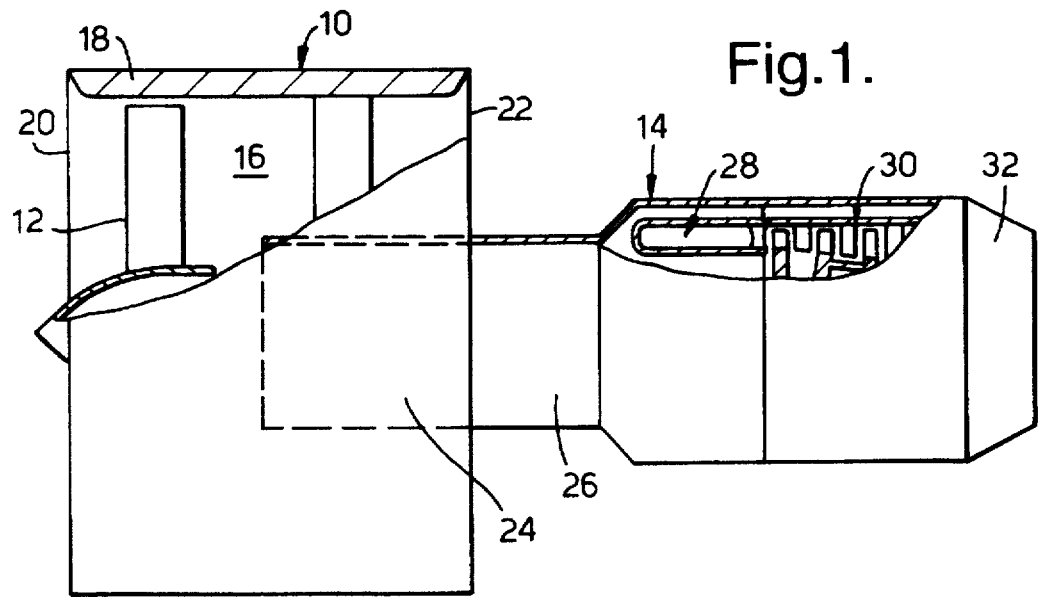
FIG. 1 is a part cross-sectional view through a turbofan gas turbine engine showing a turbine shroud having an abradable seal according to the present invention.

A turbofan gas turbine engine 10, shown in FIG. 1, comprises a fan assembly 12 and a core engine 14. The fan assembly 12 is positioned upstream of the core engine 14.

The fan assembly 12 is arranged in a fan duct 16 defined in part by a fan casing 18, the fan casing has an inlet 20 at its upstream end and a nozzle 22 at its downstream end. The fan assembly 12 is driven by the core engine 14.

The core engine 14 comprises in axial flow series an intermediate pressure compressor 24, a high pressure compressor 26, a combustor means 28, a turbine means 30 and a nozzle 32. A portion of the air initially compressed by the fan assembly 12 flows through the intermediate and high pressure compressors 24, 26 to the combustor means 28, which may be an annular combustor or a can-annular combustor or other suitable combustor arrangement. Fuel is burnt in the combustor means 28 to produce hot gases which flow through the turbine means 30. The turbine means 30 drives the fan assembly 12, intermediate pressure compressor 24 and high pressure compressor 26 via respective shafts (not shown). The air driven through the nozzle 22 by the fan assembly 12 provides the majority of the thrust. The fan casing 18 is interconnected to the core engine casing by a plurality of angularly spaced spokes 34.

Figure 2:
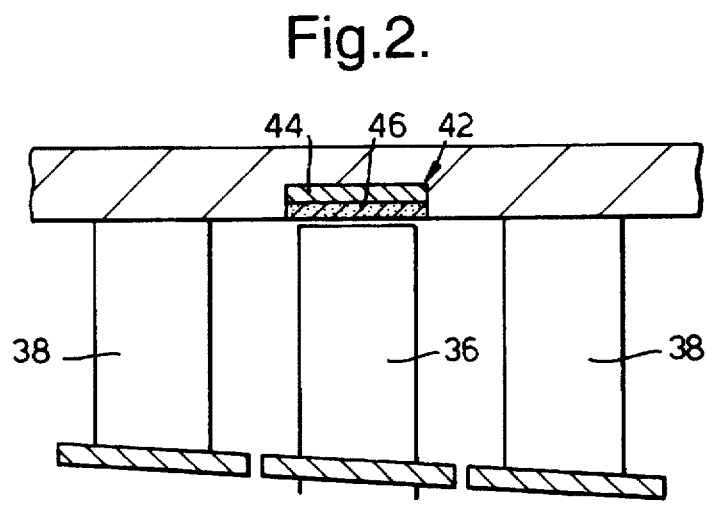
FIG. 2 is an enlarged cross-sectional view through the turbine shown in FIG. 1.

The turbine means 30 comprises a plurality of stages of turbine blades 36 and a plurality of stages of turbine vanes 38 arranged axially alternately, as shown more clearly in FIG. 2. The turbine blades 36 are secured to one or more turbine rotors (not shown) and the turbine vanes 38 are secured to the turbine casing 40. The turbine casing 40 also has a plurality of turbine shrouds 42, each one of which is arranged circumferentially around one of the stages of turbine blades 36. Each turbine shroud 42 comprises a plurality of circumferentially extending segments 44. The turbine shroud segments 44 are formed from a ceramic matrix composite material, for example the segments 44 comprise silicon carbide reinforcing fibres in an alumina matrix, although other suitable fibres and ceramic matrix materials may be used. The use of ceramic matrix composite material shroud segments 44 obviates the requirement for air cooling of the shroud segments 44 and hence improves the efficiency of the turbofan gas turbine engine 10. The turbine shrouds segments 44 are provided with an abradable seal 46 with which the tips of the turbine blades 36 cooperate to form a seal.

Figure 3:
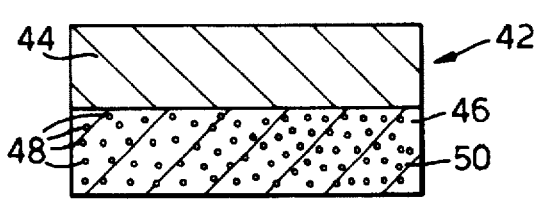
FIG. 3 is an enlarged cross-sectional view through the abradable seal shown in FIGS. 1 and 2.

The abradable seal 46 comprises a plurality of hollow aluminosilicate spheres, or hollow alumina spheres, 48 in a matrix of aluminium phosphate 50, as shown in FIG. 3. The matrix of aluminium phosphate 50 also has an aluminosilicate filler. The hollow aluminosilicate spheres, or alumina, spheres 48 have a diameter in the range of 400 to 1800 microns, preferably a diameter in the range of 800 to 1400 microns. The weight proportion of hollow aluminosilicate, or alumina, spheres 48 in the abradable seal 46 is 30% to 50%. The density of the abradable seal is 1.5 grams per cubic centimetre. The volume proportion of hollow aluminosilicate spheres is 50% to 60%.

The hollow aluminosilicate, or alumina, spheres in the aluminium phosphate matrix have a relatively high temperature capability of approximately 1300° C. maximum. This makes the abradable seal 46 better able to withstand the environment in the turbine of a turbofan gas turbine engine 10. The specific size of the hollow aluminosilicate, or alumina, spheres 48 gives a good compromise between abradability and erosion resistance. The relatively high proportion of spheres 50, 30 wt. % to 50 wt. % gives good abradability. The use of an aluminium phosphate matrix 50 enables the thermal expansion of the abradable seal to be matched to that of the ceramic matrix composite shroud segments 44. The thermal expansion is matched by the use of aluminosilicate.

The abradable seal material may be produced by mixing aluminosilicate powder, alumina powder, phosphoric acid and water to produce a paste, to which is added hollow aluminosilicate spheres, or hollow alumina spheres, and these are thoroughly mixed. In more detail 54.3 wt. % aluminosilicate powder, 23.3 wt. % alumina powder and 22.4 wt. % of 96% phosphoric acid and water are mixed together. Initially the aluminosilicate and alumina powders are mixed thoroughly. Then the phosphoric acid is added to the mixed aluminosilicate and alumina powders together with 40.44% of the total dry powder weight of distilled water. This is mixed into a paste, and is allowed to stand for 72 hours before use.

After the paste has stood for the allotted time, 30% of the total weight of hollow aluminosilicate spheres is added to the paste. The hollow aluminosilicate spheres are mixed thoroughly into the paste, if necessary using a small amount of distilled water to form a ceramic slurry.

the abradable seal material is preferably produced by mixing aluminosilicate powder and mono aluminium phosphate solution, as supplied by Alcoa International Ltd, of Marmion House, Copenhagen Street, Worcester WR1 2EL, England, using 46.2% by mass of mono aluminium phosphate solution and 53.8% by mass of aluminosilicate powder. If necessary demineralised, deionised or distilled water is added to reach a suitable viscosity. The mixture Is allowed to stand for 24 hours to produce a paste.

The paste is mixed with hollow aluminosilicate spheres using 70% by mass of the paste and 30% by mass of the hollow aluminosilicate spheres to form a ceramic slurry.

The ceramic slurry of hollow aluminosilicate spheres and paste, produced by either method mentioned above, is then moulded to the required shape by placing in a mould. Once moulded the mixture of hollow aluminosilicate spheres and paste is dried and heat treated according to form the phosphate bonds, 10 hours at 60° C., 1 hour at 120° C., 1.5 hours at 350° C., 2 hours at 800° C., 2 hours at 1100° C. and 1 hour at 1200° C.

The mixture may be moulded directly onto a ceramic composite material shroud segment or alternatively may be cast in a mould to the required shape. The mixture may be cast directly onto the ceramic composite shroud segment if the mixture has been formed using phosphoric acid, so that a bond is formed as a result of the reaction between the phosphoric acid in the mixture and the alumina matrix of the ceramic matrix composite material. If the mixture is cast separately into the required shape, the abradable seal is subsequently glued onto the ceramic composite material shroud segment. This is applicable to the mixture produced using the phosphoric acid and to the mixture produced using the aluminium phosphate solution. In the case of silicon carbide fibres in an alumina matrix the abradable seal is attached using a mixture of 46.2% by mass of of mono aluminium phosphate solution and 53.8% by mass of aluminosilicate powder as an adhesive. The abradable seal and ceramic composite material shroud are left at room temperature for 16 hours and then heat treated according to the following schedule, 10 hours at 60° C., 1 hour at 120° C., 1.5 hours at 350° C., 2 hours at 800° C., 2 hours at 1100° C. and 1 hour at 1200°C.

Although the description has referred to the abradable seal being user on the turbine shroud segments of a gas turbine engine, it is possible to use the abradable seal at other suitable positions in the gas turbine engine where an abradable seal is required. It may be possible to use he abradable seal on metallic, metal matrix composite and other material components. It may be possible to use the abradable seal in other engines or apparatus where abradable seals are required.

We claim:

1. An abradable composition comprising:

hollow aluminosilicate spheres having a diameter in the range of 400 to 1800 microns, and an aluminium phosphate matrix, the hollow aluminosilicate spheres being arranged in the aluminium phosphate matrix, the weight proportion of hollow aluminosilicate spheres being 30% to 50%.

2. An abradable composition as claimed in claim 1 wherein the hollow spheres have a diameter in the range 800 to 1400 microns.

3. An abradable composition as claimed in claim 1 wherein the abradable composition includes an aluminosilicate filler.

4. An abradable composition as claimed in claim 1 wherein the abradable composition has a density of approximately 1.5 grams per cubic centimeter.

5. A gas turbine engine having a component, the component comprising a ceramic matrix composite material, the ceramic matrix composite material comprising reinforcing fibers in a ceramic matrix material, an abradable seal being arranged on the component, the abradable seal being bonded to the component, the abradable seal comprising hollow aluminosilicate spheres having a diameter in the range 400 to 1800 microns and an aluminum phosphate matrix, the hollow aluminosilicate spheres being arranged in the aluminum phosphate matrix, the weight proportion of hollow aluminosilicate spheres being 30% to 50%.

6. A gas turbine engine as claimed in claim 5 wherein the hollow spheres have a diameter in the range 800 to 1400 microns.

7. A gas turbine engine as claimed in claim 5 wherein the abradable seal includes an aluminosilicate filler.

8. A gas turbine engine as claimed in claim 5 wherein the abradable seal has a density of approximately 1.5 grams per cubic centimeter.

9. A gas turbine engine as claimed in claim 5 wherein the component comprises a turbine shroud.

10. A gas turbine engine as claimed in claim 9 wherein the turbine shroud comprises a ceramic matrix composite material.

11. A gas turbine engine as claimed in claim 10 wherein the abradable seal is bonded to the alumina matrix by an adhesive containing mono aluminium phosphate.

* * * * *